US008989584B2

(12) United States Patent
Ruggiero et al.

(10) Patent No.: US 8,989,584 B2
(45) Date of Patent: Mar. 24, 2015

(54) RF/OPTICAL SHARED APERTURE FOR HIGH AVAILABILITY WIDEBAND COMMUNICATION RF/FSO LINKS

(71) Applicant: Lawrence Livermore National Security, LLC, Livermore, CA (US)

(72) Inventors: Anthony J. Ruggiero, Livermore, CA (US); Hsueh-yuan Pao, San Jose, CA (US); Paul Sargis, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/190,035

(22) Filed: Feb. 25, 2014

(65) Prior Publication Data

US 2014/0193158 A1    Jul. 10, 2014

Related U.S. Application Data

(63) Continuation of application No. 13/076,885, filed on Mar. 31, 2011, now Pat. No. 8,712,246.

(60) Provisional application No. 61/320,017, filed on Apr. 1, 2010.

(51) Int. Cl.
| | | |
|---|---|---|
| *H04B 10/00* | (2013.01) | |
| *G02B 17/06* | (2006.01) | |
| *H04B 10/12* | (2006.01) | |
| *H04B 10/2575* | (2013.01) | |
| *G02B 17/08* | (2006.01) | |
| *H01Q 5/00* | (2006.01) | |
| *H01Q 15/00* | (2006.01) | |
| *H01Q 19/13* | (2006.01) | |
| *H04B 10/112* | (2013.01) | |

(52) U.S. Cl.
CPC ........ *H04B 10/2575* (2013.01); *G02B 17/0856* (2013.01); *H01Q 5/0013* (2013.01); *H01Q 15/0033* (2013.01); *H01Q 19/13* (2013.01); *H04B 10/1123* (2013.01)
USPC ........... 398/115; 398/116; 359/365; 359/366; 359/399; 359/727; 359/728; 359/730; 359/857

(58) Field of Classification Search
CPC ............. H04B 10/2575; G02B 17/061; G02B 17/0631; G02B 17/0808; G02B 17/0888; G02B 17/0884
See application file for complete search history.

(56) References Cited

U.S. PATENT DOCUMENTS

| | | | |
|---|---|---|---|
| 2,819,649 | A | 1/1958 | McLeod et al. |
| 3,510,191 | A | 5/1970 | Cannon, Jr. |
| 4,645,314 | A | 2/1987 | Schroder |
| 5,574,601 | A | 11/1996 | Hall |
| 5,793,538 | A | 8/1998 | Cameron et al. |
| 5,930,055 | A | 7/1999 | Eisenberg |
| 6,231,199 | B1 | 5/2001 | Li |
| 6,445,496 | B1 | 9/2002 | Presby et al. |
| 6,667,831 | B2 | 12/2003 | Draganov et al. |
| 6,763,195 | B1 | 7/2004 | Willebrand |

(Continued)

*Primary Examiner* — Oommen Jacob
(74) *Attorney, Agent, or Firm* — John P. Wooldridge

(57) ABSTRACT

An RF/Optical shared aperture is capable of transmitting and receiving optical signals and RF signals simultaneously. This technology enables compact wide bandwidth communications systems with 100% availability in clear air turbulence, rain and fog. The functions of an optical telescope and an RF reflector antenna are combined into a single compact package by installing an RF feed at either of the focal points of a modified Gregorian telescope.

15 Claims, 7 Drawing Sheets

(56) References Cited

U.S. PATENT DOCUMENTS

| | | |
|---|---|---|
| 6,816,112 B1 | 11/2004 | Chethik |
| 7,110,678 B2 | 9/2006 | Willebrand et al. |
| 7,209,285 B1 | 4/2007 | Vanstone et al. |
| 7,486,438 B2 | 2/2009 | Bergeron et al. |
| 7,595,942 B2 | 9/2009 | Koenig |
| 7,771,067 B2 | 8/2010 | Yafuso |
| 8,712,246 B2 | 4/2014 | Ruggiero et al. |
| 2007/0177261 A1 | 8/2007 | Murdock |

RF/OPTICAL SHARED APERTURE FOR HIGH AVAILABILITY WIDEBAND COMMUNICATION RF/FSO LINKS

CROSS-REFERENCE TO RELATED APPLICATIONS

This application is a continuation of U.S. patent application Ser. No. 13/076,885, titled "RF/Optical Shared Aperture for High Availability Wideband Communication RF/FSO Links," filed Mar. 31, 2011, incorporated herein by reference. U.S. patent application Ser. No. 13/076,885 claims the benefit of U.S. Provisional Patent Application No. 61/320,017, titled "RF/Optical Shared Aperture for High Availability Wideband Communication RF/FSO Links," filed Apr. 1, 2010, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

1. Field of the Invention

The present invention relates to wireless communications, and more specifically, it relates to radio-frequency (RF) and free-space optical (FSO) communications.

2. Description of Related Art

The availability of free-space optical links is limited by atmospherics and weather conditions. RF and microwave systems are less susceptible to these problems. Hybrid RF/Optical communications systems that can switch back and forth between RF and Optical transmissions in order to optimize the overall availability of the link and maximize communication performance would be a solution. The use of a terminal with shared RF/Optical aperture could provide the overall link availability advantage described above in the smallest form factor possible. This becomes increasingly important in deployment scenarios where space is at a premium and the use of multiple RF and optical apertures is not desirable, for example on small aircraft, satellites, and in certain ground vehicles and ground deployments.

As discussed in U.S. Pat. No. 6,667,831, incorporated herein by reference, FIG. 1 illustrates a traditional Gregorian telescope 100 according to the prior art. The Gregorian telescope 100 has a concave primary mirror 102 and a concave secondary mirror 104. In many traditional Gregorian telescopes, the primary mirror has a parabolic curvature and the secondary mirror has an elliptical curvature. The secondary mirror 104 is disposed outside the focal plane of the primary mirror 102, and the mirrors share a common optical axis 106. The primary mirror 102 reflects light from a far field and directs the light towards the secondary mirror 104. The secondary mirror 104 is appropriately sized and positioned so that light reflecting off the primary mirror 102 is incident on the secondary mirror 104. The secondary mirror 104 reflects light and directs it through an aperture 108 in the primary mirror 102 that is centered about the optical axis 106. The light is thereafter imaged at the focal plane 110 of the compact telescope for advantageous use.

FIG. 2 illustrates an embodiment of a compact telescope as discussed in U.S. Pat. No. 6,667,831. The compact telescope 200 comprises a first reflecting surface 202 and a radially defined second reflecting surface 204. The first reflecting surface 202 includes an annular outer portion 206, a radially defined inner portion 208, and a radially defined aperture 210. Other shapes may be used for these elements of the compact telescope, however, alternative shapes may increase the complexity of the optics.

The outer portion 206 of the first reflecting surface 202 is the functional equivalent of the primary mirror in a traditional Gregorian telescope, while the inner portion 208 is the functional equivalent of the secondary mirror. Therefore, hereinafter, the term "primary mirror," as it relates to a compact telescope, is used interchangeably with the outer portion 206 of the first reflecting surface. Likewise, the term "secondary mirror", as it relates to a compact telescope, is used interchangeably with the inner portion 208 of the first reflecting surface. The primary and secondary mirrors 206, 208 are both concave, with the curvature of the secondary mirror 208 being greater than the curvature of the primary mirror 206. In FIG. 2, both the primary mirror 206 and the secondary mirror 208 have elliptical curvatures (i.e., conic between −1 and 0). Those skilled in the art will recognize that with both mirrors having elliptical curvatures, correcting for both spherical and coma aberrations is facilitated without the need for additional optical elements. In an alternative embodiment, the primary mirror 206 may have a parabolic curvature (i.e., conic equal to −1) and the secondary mirror 208 may have an elliptical curvature. Other curvatures may also be used for the primary and secondary mirrors 206, 208 of the compact telescope.

The optical axes 212 of the primary and secondary mirrors 206, 208 are coincidental. Additionally, the aperture 210 and the second reflecting surface 204 are centered upon the coincident optical axes 212. Non-coincidental and/or off-axis optics may be employed, however, coincident optical axes reduce complications in aligning the optical elements and simplify the optics of the compact telescope.

In the embodiment of FIG. 2, the primary and secondary mirrors 206, 208 form the integral first reflecting surface 202. Such a double-curved mirror facilitates manufacturing and optical axis alignment of each curvature on the first reflecting surface 202. This is important because greater errors in axis alignment result in greater optical aberrations. For example, a double-curved mirror may be Manufactured using diamond turning or other appropriate equipment that is frequently used to create high quality mirrors. With the appropriate manufacturing equipment, the primary and secondary mirrors may be manufactured sequentially using a single piece of equipment without realigning the equipment to obtain coincidental axes.

Alternatively, in lieu of a double curved mirror, the compact telescope may comprise a first reflecting surface having an annular shape (the primary mirror), with a third reflecting surface (the secondary mirror) disposed within the inner radius of the first reflecting surface. The curvatures of this alternative embodiment for the first and third reflecting surfaces are the same as the curvatures for the aforementioned outer and inner portions, respectively.

Returning to FIG. 2, the second reflecting surface 204 is a planar surface, hereinafter referred to as the "folding mirror". The folding mirror 204 optically couples the primary mirror 206 to the secondary mirror 208. The folding mirror 204 is disposed between the first reflecting surface 202 and the focal plane of the primary mirror 206. Thus, light from a far field may enter the primary aperture of the compact telescope 200 and reflect off the primary mirror 206 towards the folding mirror 204. The folding mirror 204 reflects such light towards the secondary mirror 208, and the secondary mirror 208 reflects the light back towards the folding mirror 204. Upon this second reflection from the folding mirror 204, the light passes through the aperture 210. Light emerging from the aperture 210 creates an upright image at the focal plane 214 of the compact telescope that may be advantageously used.

Alternative embodiments of the compact telescope may include a curved folding mirror. A curved folding mirror preferably has a high radius of curvature, such as a radius of 1 meter or more. Smaller curvatures may also be employed. In another alternative embodiment, the folding mirror comprises a steering mirror. The steering mirror may have a planar or curved reflective surface. A steering mirror having a curved reflective surface may help improve the optics of a compact telescope when the optical axes of the primary and secondary mirrors are imprecisely aligned.

SUMMARY OF THE INVENTION

It is an object of the present invention to combine free space optical and RF communications into a single networked system to provide compact, robust, high bandwidth mobile communications for commercial, military and government applications.

This and other objects will be apparent based on the disclosure herein.

The invention provides embodiments of an RF/Optical shared aperture for high availability wideband communication RF/FSO links that have a communications terminal capable of transmitting and receiving optical signals and RF signals simultaneously. RF/Optical hybrid technology enables communications systems with 100% availability in clear air turbulence, rain and fog. RF and optical communications transmitters have different sensitivities to atmospheric perturbations; consequently selective switching between systems provides an optimal solution. In embodiments of the current invention, a RF/millimeter wave (RF/MM) beam is fed into an optical telescope at one of two focal points in a manner that does not perturb the optical beam. In some embodiments, a planar patch fixed beam array antenna with a through hole in the array center is placed at the co-location of the optic focal plane of a compact telescope to create the optical and radio frequency (RF) shared aperture terminal. The patch array antenna is the feed for RF frequency. This feed is designed and configured so that it does not disturb the path of the original optical rays. Both optical and RF share the same aperture without interfering with the performance of one another. In other embodiments, a RF/millimeter-wave feed is installed at the focal point of the primary reflector, which is in front of the secondary mirror. A properly designed dichroic plate replaces the standard aluminum secondary mirror of the modified Gregorian system. This dichroic plate reflects the optical signal and transmits the RF signal. This invention enables extremely compact implementation of RF/Optical hybrid technology for high data capacity and high availability communications.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

To achieve a high-availability, high throughput data link, it is advantageous to employ a hybrid communication system architecture capable of both RF and optical transmission. This approach enables high capacity data transfer over the optical channels during good atmospheric and weather conditions and provides a smooth transition to a lower data rate RF channel in bad weather. For applications where limited space is available, such as an airborne platform, it is desirable to combine the functions of the optical telescope and the RF antenna into a single compact package. Such a device, referred to herein as an RF/optical shared aperture, is a terminal that is capable of transmitting and receiving optical signals and RF signals simultaneously to and from the same aperture. The present invention utilizes recent developments in precision-machined telescopes and customized patch array antenna feeds. See, e.g., U.S. Pat. No. 6,667,831, titled Compact Telescope," incorporated herein by reference.

Dichroic Folding Mirror and RF Feed

Figure 1:
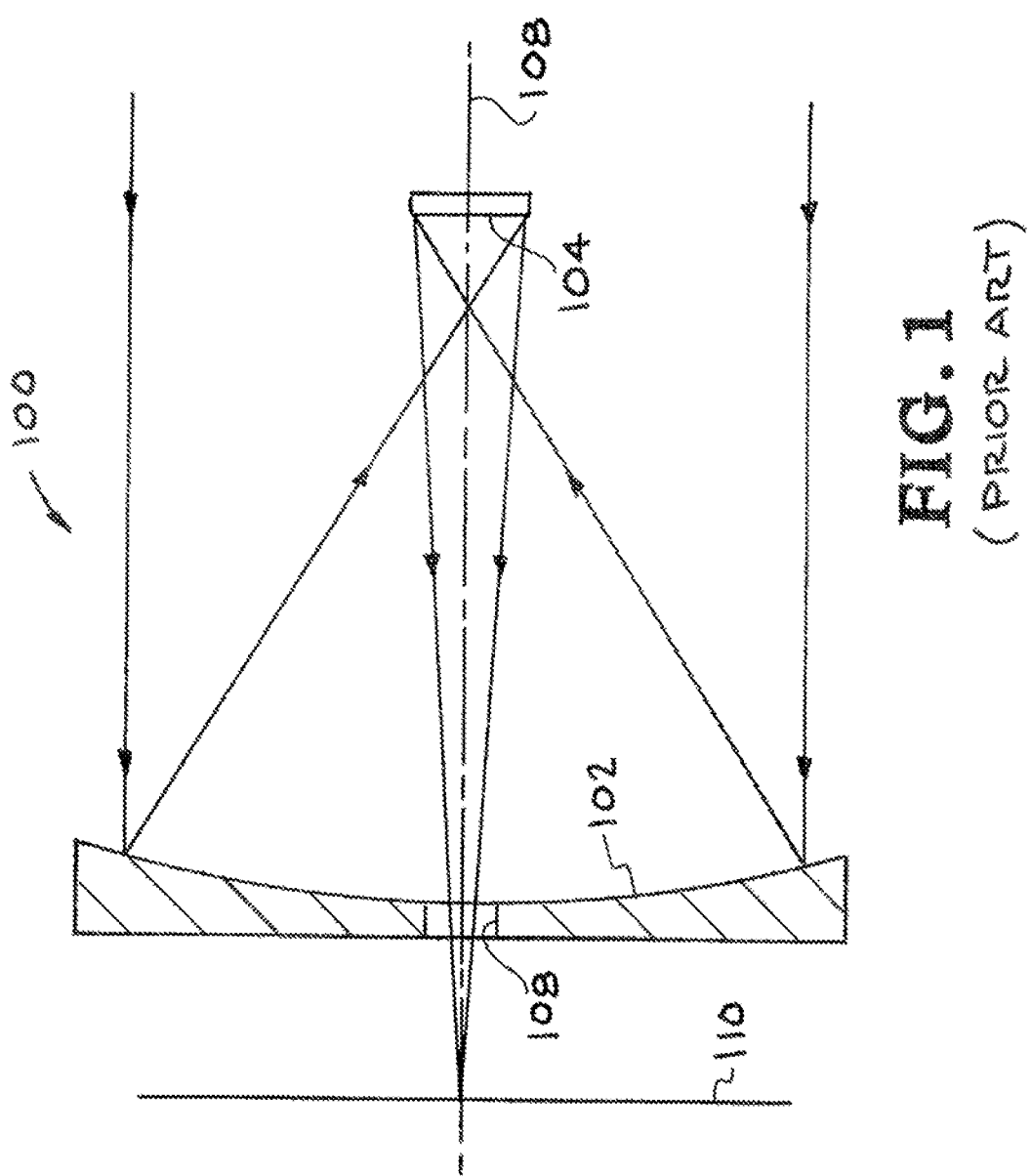
FIG. 1 shows a prior art Gregorian telescope.
Figure 2:
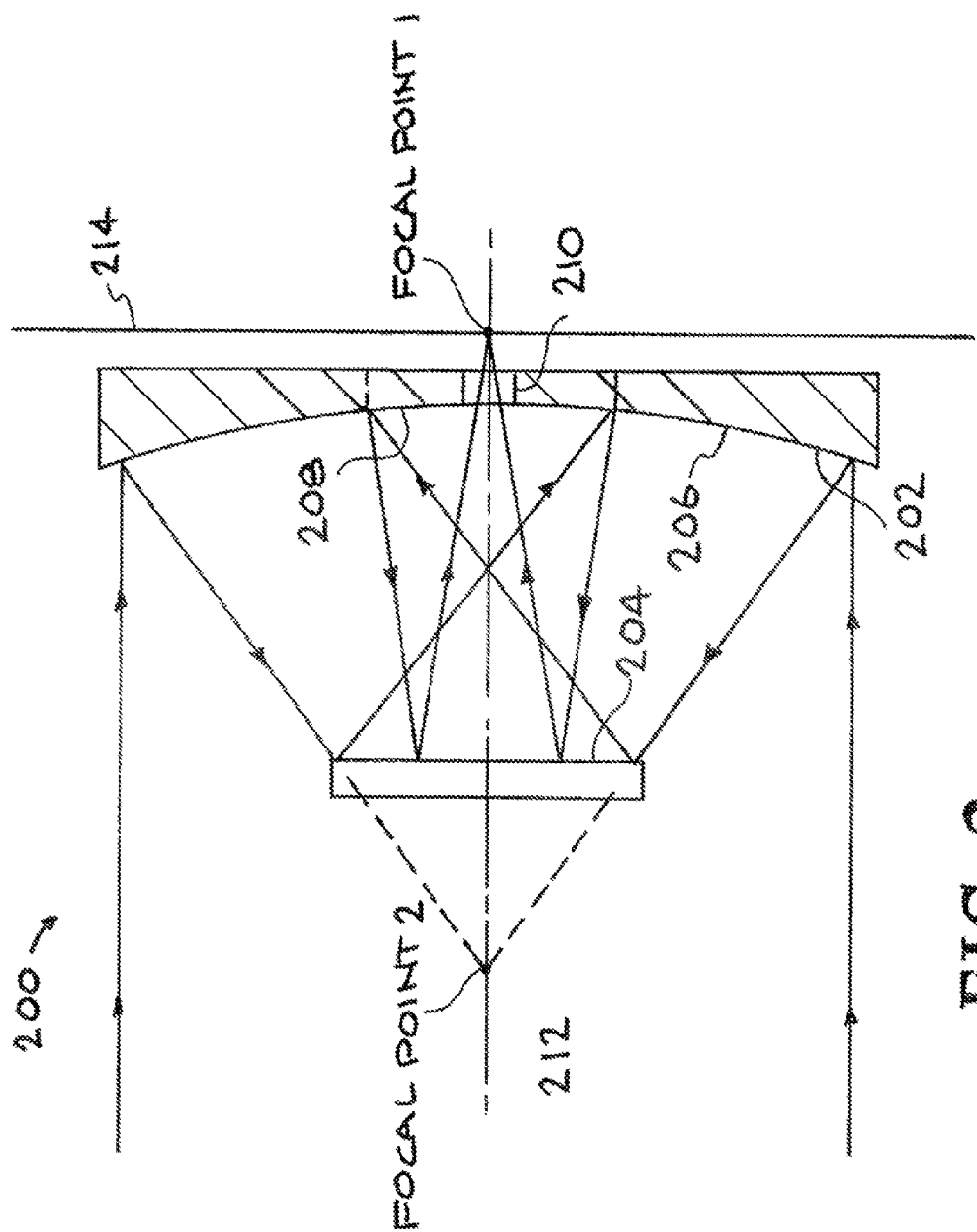
FIG. 2 shows a prior art modified Gregorian telescope.
Figure 3:
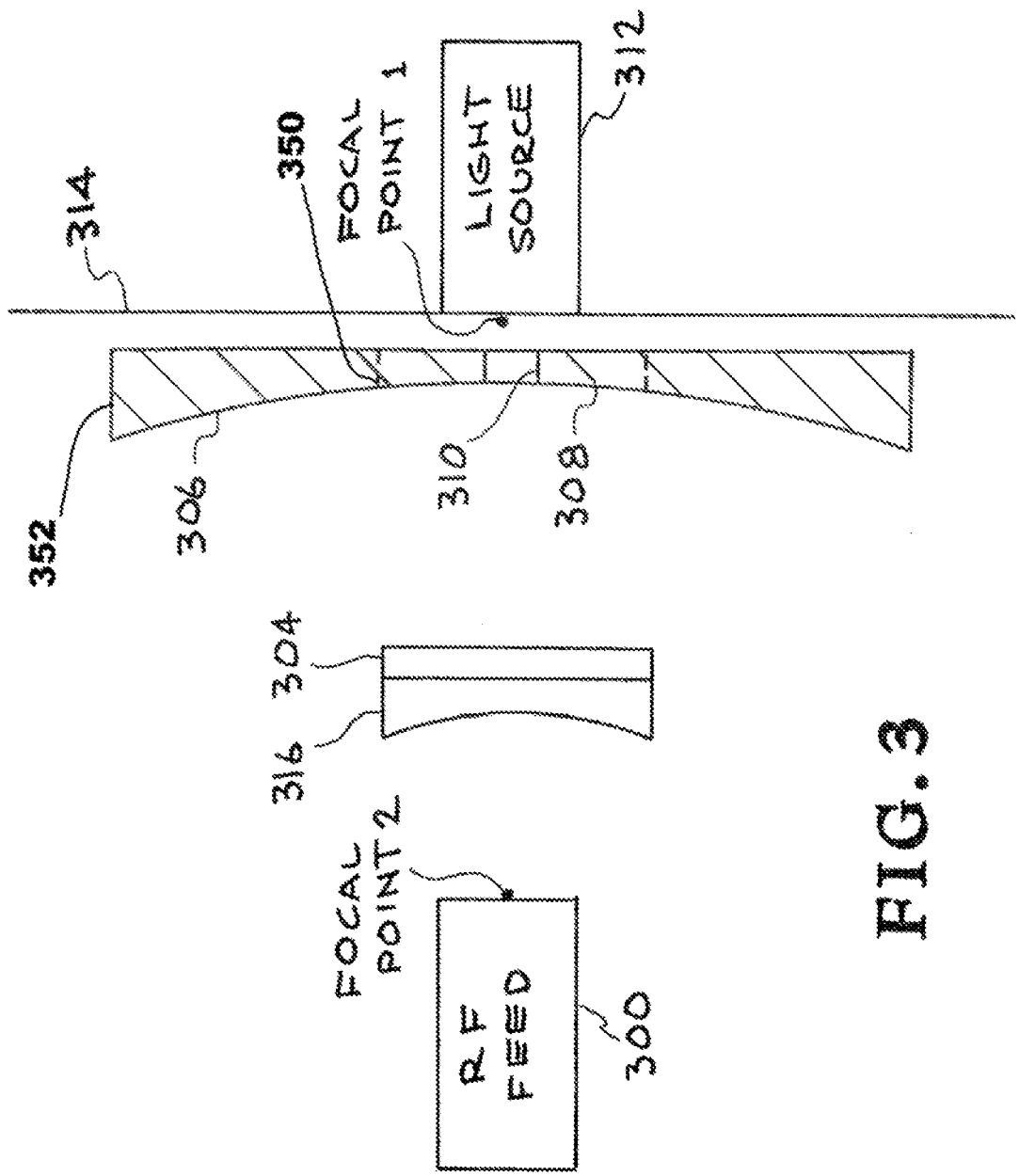
FIG. 3 shows an embodiment of a modified Gregorian telescope with a dichroic folding mirror, an RF signal compensating element, a light source at focal point 1 and an RF feed at focal point 2.

FIG. 3 shows an embodiment of the present invention having an RF feed 300 located at the focal point of the primary mirror 306. The embodiment includes a dichroic folding mirror 304, a primary mirror 306 (shown in cross section) and having an inner perimeter 350 and an outer perimeter 352, a secondary mirror 308 shown cross section) and disposed within said inner perimeter and having an aperture 310. The embodiment further includes a light source 312 at a second focal plane 314 of the system and a compensating element 316. If the folding mirror is made of material, such as solid aluminum, that will not transmit an RF signal, it would block the RF energy that is directed from RF feed 300 toward the primary and secondary mirrors. In the present invention, the solid disc-shaped metallic folding mirror 204 of the prior art is replaced with folding mirror 304 made of dichroic material that is able to efficiently reflect the incident optical beam from light source 312, often having a wavelength of 1550 nm, while maintaining transparency to RF energy. Due to the design of the telescope, the direction of the incident optical beam ranges between normal to the surface and about 40° from normal.

The dichroic folding mirror 304 achieves high reflective performance in the optic band by acting as synthetic Bragg crystals. This effect is created by layers of materials deposited in a periodic stack. The thickness of each layer is often less than one tenth of a micrometer. The materials used for the layers are dielectrics, such as pyrex. Through constructive interference of the reflected light, this structure can efficiently reflect the incident optical signal according to Brags law, which relates the reflected wavelength to the angle of the incident light. The dichroic folding mirror 304 is transparent to the RF signal because the thickness of the layers that construct the plate is typically less than three orders of the RF wavelength. This produces no wave phenomena as the RF signal passes through the plate; therefore, the Bragg crystal is transparent to the RF signal. There is no constructive reflection. Furthermore, the conductivity of the layer material is very low in the RF band. The insertion loss is negligible. A portion of the RF signal transmitting through folding mirror 304 will impact onto the primary mirror 306 and a portion will impact onto the secondary mirror 308. Because the secondary mirror has a different curvature than the primary mirror, the secondary mirror will reflect incident RF signal in a different direction than the direction of RF rays that reflect from the primary mirror. In order to compensate the RF signal direction for the different curvature of the secondary mirror, a dielectric lens 316, having a properly designed thickness and curvature, is inserted between the folding mirror 304 and the RF source 300. As shown in FIG. 3, an embodiment of the invention places dielectric lens element 316 in contact with folding mirror 304. In this embodiment, the diameters of the dielectric lens, the folding mirror and the secondary mirror 308 are about the same. Dielectric lens element 316 has a thickness and curvature that will cause the transmitted RF signal to reflect from the secondary mirror 308 such that the signal will have the same direction as the signal reflecting from the primary mirror 306. The RF signal reflecting from the secondary secondary mirror will be collimated as it propagates out of the telescope. Based on the teachings herein, those skilled in the art will be able to properly design dielectric lens element 316.

Figure 4:
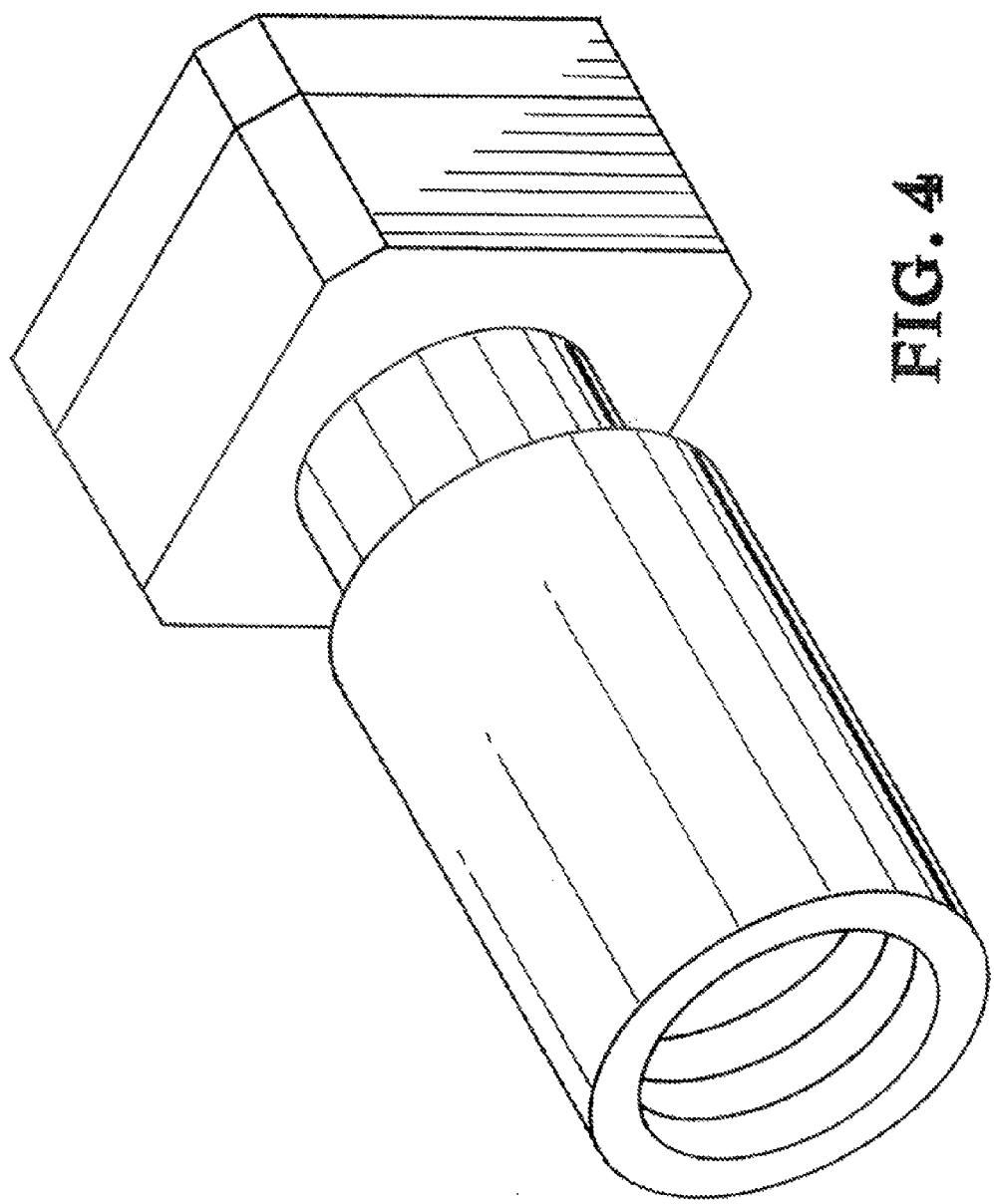
FIG. 4 shows a picture of a millimeter-wave scalar feed horn antenna which can be used in the embodiment of FIG. 3.

FIG. 4 shows a picture of an exemplary millimeter-wave scalar feed horn antenna which can be used as RF feed 300 as depicted in FIG. 3. This type of feed horn has a highly symmetrical antenna pattern and very low side lobe characteristics. It can be designed to uniformly illuminate the primary mirror, while occupying a small volume (25 mm diameter, 70 mm length). Scalar teed horn antennas are commercially available.

Aluminum Secondary Mirror and Back-Mounted RF Feed

Figure 5:
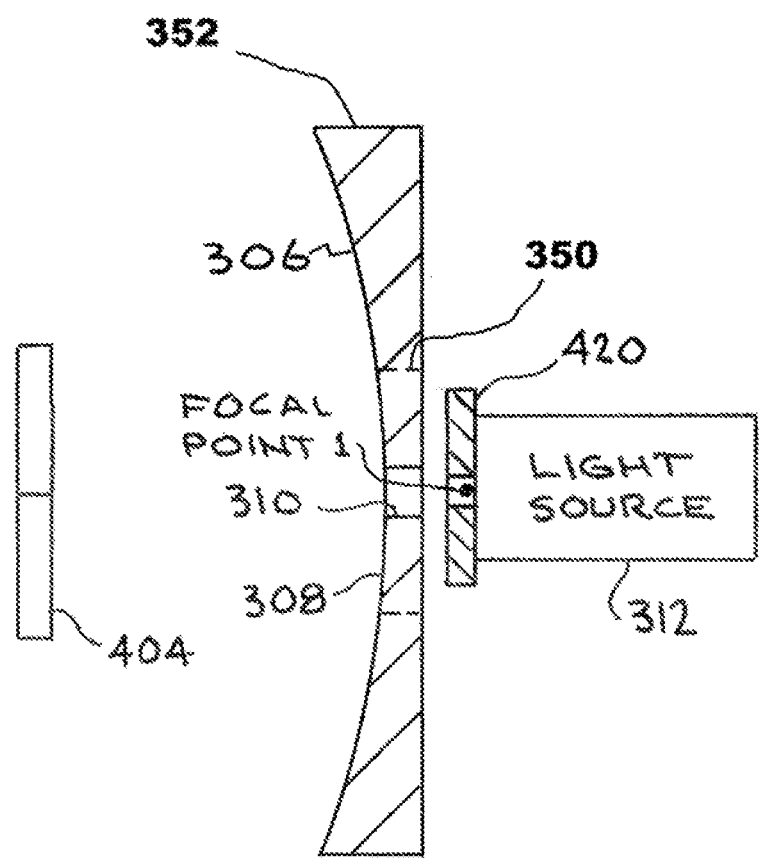
FIG. 5 shows an embodiment of a modified Gregorian telescope with an aluminum folding mirror and both a light source and an RF antenna at focal point 1.
Figure 6:
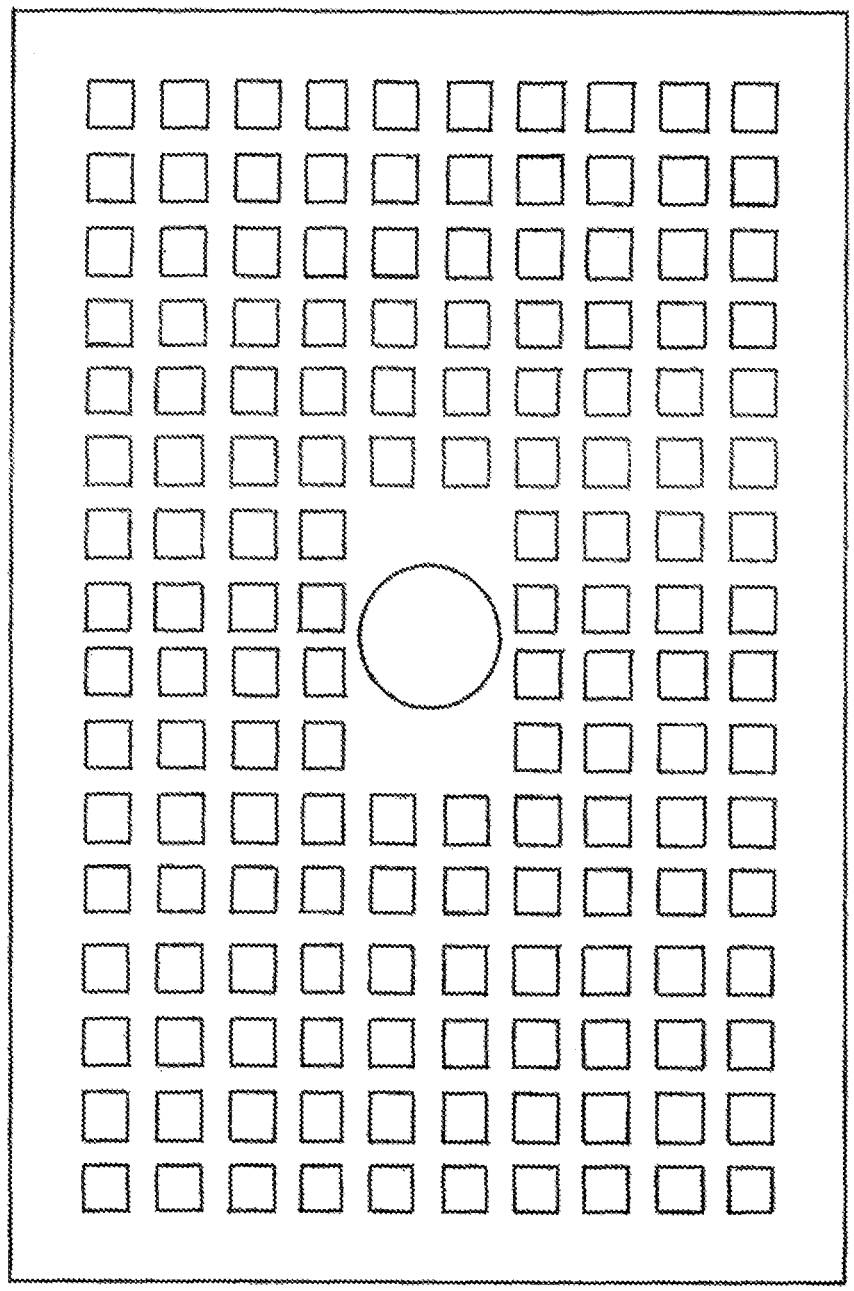
FIG. 6 shows a black-and-white line illustration of a 16×10 slot array feed antenna.
Figure 7:
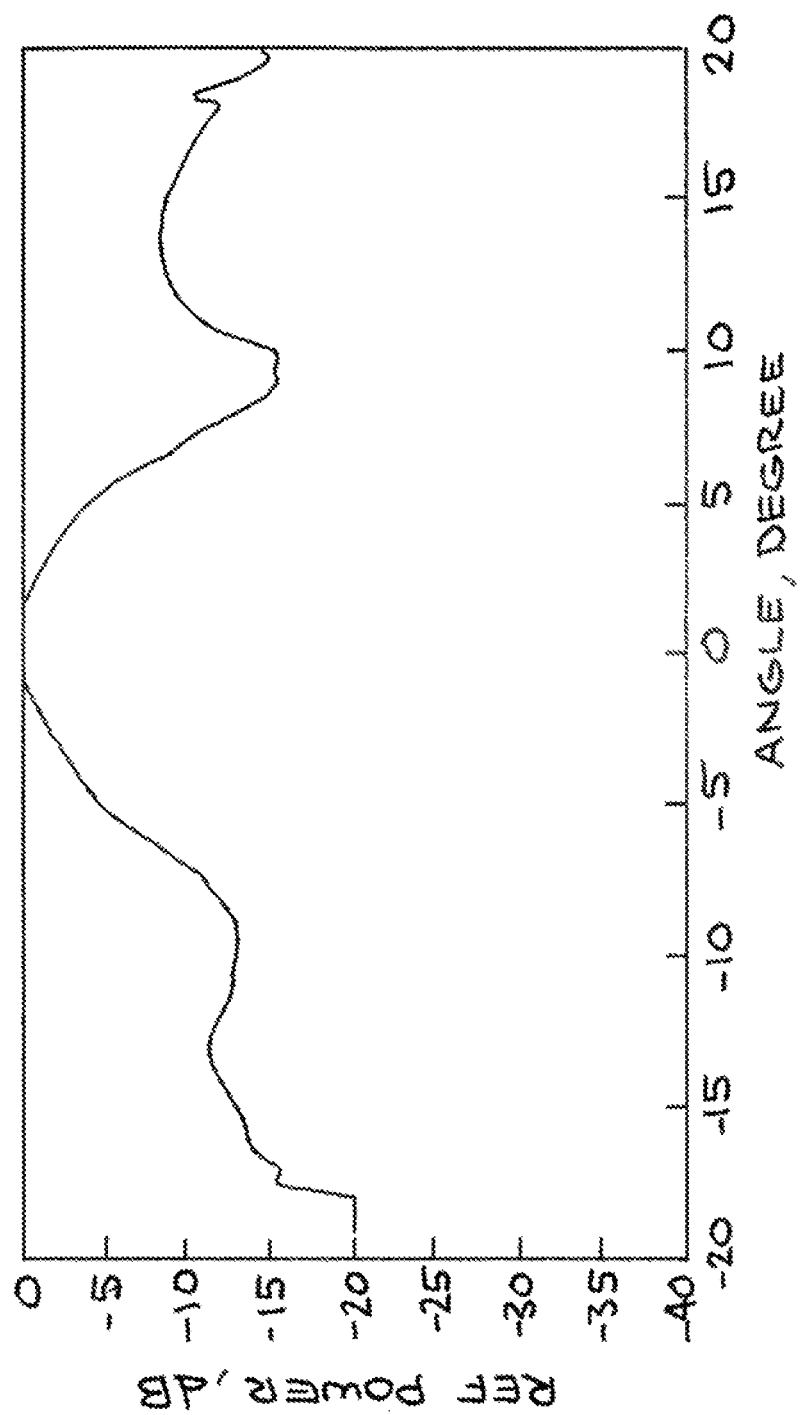
FIG. 7 shows the measured antenna radiation pattern of a 16×10 slot array feed antenna.

FIG. 5 illustrates a device that provides the RF signal and the optical signal from the same aperture. Elements common to the embodiment of FIG. 3 are identically numbered. The apparatus places a RF feed 420 and the light source 312 at focal point 1 of FIG. 5. In this configuration, RF energy that is transmitted through the aperture 310 of the secondary mirror 308, is reflected by aluminum folding mirror 404 and is emitted from the primary mirror 306. Since both RF and optical feeds share this focal point, the RF feed antenna must be planar and include a central hole through which the optical beam can pass. A slot-array feed antenna, as known in the art, may be designed to include a central hole, as illustrated in FIG. 6. This slot array design was taken through manufacturing at Kyocera America. The actual antenna radiation pattern of the Kyocera 16×10 slot-array feed is shot in FIG. 7.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
   a first reflecting element comprising a concave primary mirror and a concave secondary mirror, wherein said concave primary mirror has an inner perimeter, an outer perimeter and a first curvature, wherein said concave secondary mirror is disposed within said inner perimeter and comprises a central aperture and a second curvature that is greater than said first curvature;
   a folding mirror facing said concave secondary mirror, wherein said folding mirror is configured to reflect a radio-frequency signal (RFS) and an optical signal (OS);
   an RFS source configured to direct said RFS through said central aperture such that said RSF will first be reflected by said folding mirror and will then be reflected by said concave primary mirror; and
   an OS source configured to direct said OS through said central aperture such that said OS will first be reflected by said folding mirror and will then be reflected by said concave primary mirror.

2. The apparatus of claim 1, wherein said OS comprises a wavelength of 1550 nm.

3. The apparatus of claim 1, wherein said folding mirror, said primary mirror and said secondary mirror all comprise material that is reflective to both said RFS and said OS.

4. The apparatus of claim 1, wherein said RFS source comprises a slot-array feed antenna.

5. The apparatus of claim 4, wherein said slot-array feed antenna comprises a central hole, wherein said central hole is positioned between said OS source and said central aperture such that said RFS will propagate through said central hole and said central aperture to impact said folding mirror.

6. A method, comprising:
   providing the apparatus of claim 1;
   producing said RFS from said RFS source;
   directing said RFS through said central aperture, wherein said RSF is reflected by said folding mirror and is then reflected by said concave primary mirror;
   producing said OS from said OS source; and
   directing said OS through said central aperture, wherein said OS is reflected by said folding mirror and is then reflected by said concave primary mirror.

7. The method of claim 6, wherein said OS comprises a wavelength of 1550 nm.

8. The method of claim 6, wherein said folding mirror, said primary mirror and said secondary mirror all comprise material that is reflective to both said RFS and said OS.

9. The method of claim 6, wherein said RFS source comprises a slot-array feed antenna.

10. The method of claim 9, wherein said slot-array feed antenna comprises a central hole, wherein said central hole is positioned between said OS source and said central aperture such that said RFS will propagate through said central hole and said central aperture to impact said folding mirror.

11. A fabrication method, comprising:
    providing a first reflecting element comprising a concave primary mirror and a concave secondary mirror, wherein said concave primary mirror has an inner perimeter, an outer perimeter and a first curvature, wherein said concave secondary mirror is disposed within said inner perimeter and comprises a central aperture and a second curvature that is greater than said first curvature;
    configuring a folding mirror such that it is facing said concave secondary mirror, wherein said folding mirror is configured to reflect a radio-frequency signal (RFS) and an optical signal (OS);
    configuring an RFS source to direct said RFS through said central aperture such that said RSF will first be reflected by said folding mirror and will then be reflected by said concave primary mirror; and
    configuring an OS source to direct said OS through said central aperture such that said OS will first be reflected by said folding mirror and will then be reflected by said concave primary mirror.

12. The method of claim 11, wherein said folding mirror is configured to reflect an OS comprising a wavelength of 1550 nm.

13. The apparatus of claim 11, wherein said folding mirror, said primary mirror and said secondary mirror all comprise material that is reflective to both said RFS and said OS.

14. The method of claim 11, wherein said RIPS source comprises a slot-array feed antenna.

15. The method of claim 14, wherein said slot-array feed antenna comprises a central hole, wherein said central hole is positioned between said OS source and said central aperture such that said RFS will propagate through said central hole and said central aperture to impact said folding mirror.

\* \* \* \* \*